United States Patent [19]

Braschler

[11] 4,043,434
[45] Aug. 23, 1977

[54] MECHANICALLY ADJUSTABLE DUAL POCKET HYDROMATIC BRAKE

[75] Inventor: Steve A. Braschler, Coffeyville, Kans.

[73] Assignee: Parmac, Inc., Coffeyville, Kans.

[21] Appl. No.: 676,487

[22] Filed: Apr. 13, 1976

Related U.S. Application Data

[63] Continuation-in-part of Ser. No. 501,772, Aug. 29, 1974, abandoned.

[51] Int. Cl.² ............................................. F16D 57/04
[52] U.S. Cl. ...................................... 188/296; 60/334; 60/353; 60/367
[58] Field of Search ........................ 188/296; 73/134; 60/334, 335, 353, 367

[56] References Cited

U.S. PATENT DOCUMENTS

| | | | |
|---|---|---|---|
| 1,992,912 | 2/1935 | DeLaMater | 188/296 X |
| 2,283,244 | 5/1942 | Walker | 188/296 X |
| 2,392,520 | 1/1946 | Benz et al. | 60/353 X |
| 2,890,661 | 6/1959 | Elbert | 60/367 X |

FOREIGN PATENT DOCUMENTS

| | | | |
|---|---|---|---|
| 802,030 | 2/1951 | Germany | 188/296 |
| 423,510 | 7/1947 | Italy | 188/296 |
| 88,615 | 7/1958 | Netherlands | 188/296 |

Primary Examiner—George E. A. Halvosa
Attorney, Agent, or Firm—Head, Johnson & Chafin

[57] ABSTRACT

A hydrokinetic action brake for particular use in controlling the speed of a hoisting drum used in the drilling of oil and gas wells. The brake includes dual pocketed stator and rotor assemblies with a cylindrical member movable within the pockets to adjust the flow of the fluid within either the outer and/or inner pockets for varying load and speed conditions.

12 Claims, 7 Drawing Figures

MECHANICALLY ADJUSTABLE DUAL POCKET HYDROMATIC BRAKE

CROSS-REFERENCES

This is a continuation-in-part of copending application Ser. No. 501,772, filed Aug. 29, 1974, and now abandoned. The Application is also related to U.S. Pat. No. 3,860,097 issued Jan. 14, 1975.

PRIOR ART

U.S. Pat. Nos. 2,890,661; 3,572,480; 1,992,911; 3,072,222; 3,371,890; 3,399,747; 3,414,333; 3,489,252; 3,467,225; 1,685,735; 1,992,912.
Italy Pat. No. 423,510
Netherlands Pat. No. 88,615
Germany Pat. No. 802,030
Great Britain Pat. No. 589,790

BACKGROUND OF THE INVENTION

This invention lies in the field of hydrokinetic brakes for use as dynamometers, retarders for vehicles and hydromatic brakes on rotary drilling rigs. Specifically the invention is concerned with hydromatic brakes utilized to absorb energy by the regulation or control of the fluid being circulated through the brake.

It is well known in the art that such hydromatic brakes consist of a rotor and stator which have opposing pockets. The shape of the pockets in the rotor and stator vary in shape from one design to the other, some being spherical, elliptical, or rectangular. In all of the designs the operating principle is the same.

As the rotor is rotated, the fluid contained in the brake is caused to flow from the inside diameter of the rotor pocket to the outside diameter of the rotor pocket. Energy is imparted to the fluid due to the rotation of the rotor and and momentum of the fluid is increased. If the fluid was allowed to exit from the brake, after leaving the rotor, the power required to increase the momentum of the fluid would be equal to the energy required by a hydraulic pump, and very little power would be absorbed by the brake.

However, in a hydromatic brake, the fluid exiting from the rotor flows across the gap between the rotor and stator and into the staor pocket. The fluid is directed from the outside diameter of the stator pocket to the inside diameter of the stator. As the fluid exits from the stator it impinges on the rotor vanes in a direction against the direction of rotation.

The power absorbed by the brake is due to the momentum imparted to the fluid by the rotor, the friction loss of the fluid flowing in the rotor and stator pockets, and the energy of the fluid flowing from the stator into the rotor against the direction of rotation.

The friction loss due to the fluid flowing within the rotor/stator pockets is minimal compared to the momentum imparted to the fluid by the rotor and the subsequent flow of the fluid directed, as a result thereof, against the rotor by the stator.

In most hydro-kinetic brake installations, the amount of power absorbed is controlled by the amount of fluid contained in the brake, which is regulated by the amount of fluid flowing through the brake. The power absorption is maximum when the brake is completely full of fluid and decreases as the quantity of fluid contained or flow rate is decreased.

The quantity of fluid or flow rate is regulated by adjusting a valve installed in the inlet to the brake, or by a level tank. The brake is designed to operate full of fluid with the inlet line full open. By closing a valve in the inlet, the flow of fluid to the brake is reduced due to the orificing of the inlet by the valve and thus the quantity of the fluid into the brake pockets is reduced. The fluid level in the tank can be reduced thus reducing the head applied at the inlet of the brake as another means of control.

Of particular interest currently is the utilization of a safe braking means for oil well drilling rigs. The brake is attached to the hoisting drum of the rotary drilling rig and is used to retard the descent of the hook when going into the hole. Since the weight on the hook varies, the absorption capacity of the brake must be changed in order to retard the hook to the same velocity for different hook weights.

In the past, the two methods of flow regulation and level control for regulating the absorption capacity of the brake have been adequate, but have never been completely satisfactory. The drilling rig is designed to handle a maximum hook load or weight as a function of a drilling depth. The brake is then matched to the drilling rig by installing a brake that will retard the maximum hook load to a safe descent speed such as 200 FPM when operating full of fluid.

As the drill pipe, used in drilling the oil well, is connected together, the hook load will increase from a minimum to the maximum as the drilling depth increases. On most rigs, the hydromatic brake is not used until the hook load reaches a certain value, because the friction brake on the hoisting drum can be used to retard and stop the hook. After a particular hook load is reached, the hydromatic brake is engaged to retard the load to a safe descent velocity. At this point very little fluid is required in the brake. As the load increases, the fluid contained in the brake is increased so that the brake will retard the increasing hook load to the same velocity. In order for the brake to retard a load to a constant velocity, the quantity of fluid contained in the brake must remain constant. In other words, the amount of fluid entering the brake must equal the amount of fluid exiting the brake. Should the flow out exceed the flow into the brake, the brake speed will increase causing the brake to run away with itself and hence excessive descent velocity.

All of the hydromatic brakes have a minimum point of operation where for a certain light load the brake will operate at a particular steady speed. If the speed of the brake is increased by reducing the amount of fluid in the brake, an unsteady condition will result because the brake cannot receive the same amount of fluid as that being discharged. The above problem is encountered on drilling rigs nowadays, due to the deeper drilling depths and hence wider operating range of load imposed upon the brake.

When the hydromatic brake is supplied fluid by a hydraulic pump, and the braking is controlled by a manually operated inlet valve, between the brake and the pump, another control problem arises.

While a stand of drill pipe is being connected to the drill string, the hydromatic brake is not being rotated and is at rest. During this time, the pump fills the brake completely with fluid. However, for the load on the hook, the brake must operate partially full of fluid to obtain the descent speed desired. Thus, the brake must discharge some of the fluid in order to obtain a flow balance between the inlet and outlet. During the period of discharging the excess fluid, the hook descends at a slower speed than desired. To compensate for the slow descent speed, at the start of the drop, the driller will reduce the opening in the inlet valve in order to prevent the brake from filling with fluid during the rest period. Then during operation of the brake, the inlet is restricted so that the brake cannot obtain a balance between the flow in and out, and the load runs away as stated before.

In order to avoid the above problems of controlling the braking action, the brake should be controlled internally. By controlling the brake internally, the fluid system outside the brake housing would not affect the control of the brake.

One method of internal control that is well known in the art, is to restrict the fluid from flowing into the stator pockets. By eliminating the fluid from entering the stator pockets, the fluid is not allowed to impinge on the rotor.

In the prior art, such as DeLaMater, U.S. Pat. No. 1,992,911, movable plates have been installed between the rotor and stator faces. As the fluid exits from the rotor, it is blocked from entering the stator by the adjustable plates. To permit braking, the plates are removed from between the rotor and stator and fluid circulation is resumed.

There are several disadvantages of the adjustable plates used in the prior art. It is well known in the art that the greater the gap between the rotor and stator faces, less braking is achieved. For maximum braking, the rotor face should be as close as possible to the stator face in order for the fluid to enter the stator pocket as it exits from the rotor pocket. If the gap between the rotor and stator is large, the fluid does not flow into the stator pocket, instead the fluid flows out of the brake outlet and is lost.

Installing the adjustable plates between the rotor and stator increases the gap which will decrease the maximum braking when the plates are retracted.

If the plates are made thin in order to keep the gap at a minimum, rigidity in the plates is lost and the force of the impinging water will cause the plates to bend and rub against the stator face. Thus, the friction between the plate and stator requires considerable force to move the adjustable plates.

If the adjustable plates are moved in and out perpendicular to the brake centerline, the brake housing becomes quite large in order to accommodate the adjustable plates.

Some of the brake's inlet tubes are in the vanes of the stator and emerge at the end of the stator vane. If the brake is being rotated and very little braking is desired, the adjustable plates are moved inwardly and cover the inlet tubes. Since the supply of fluid to the brake is blocked by the adjustable plates, the rotor will become dry and excessive heat will be generated due to agitation of the air in the pocket and there will be a 'run away' condition.

Others in the prior art have taught the adjustment of the braking force by throttling the pocket circulation, such as Italian Pat. No. 423,510 (1947), British Pat. No. 589,790 (1947) and U.S. Pat. No. 3,572,480 (1971). However, these devices are incapable of providing adjustments to the flow rate or quantity of fluid within the brake sufficiently to operate within the wide range necessary for use as with drilling rig hoist equipment.

SUMMARY OF THE INVENTION

It is a primary object of this invention to provide a type of hydrokinetic brake in which a flat operating characteristic of speed versus load can be provided through a selected range of load.

It is a further object of this invention to provide a controlled hydrokinetic brake in which means are provided for controlling the rate of flow of liquid in a large pocket of the stator while maintaining continuous flow in a small pocket of the stator.

It is a still further object of this invention to provide a hydrokinetic brake in which the load characteristic is varied by controlling the rate of flow of liquid in both a large pocket and a small pocket of the stator.

These and other objects are realized and the limitations of the prior art are overcome in this invention by providing a hydrokinetic brake of the type where flow from a rotor is directed in an essentially axial direction and in which both the rotor and the stator have a large annular pocket in their matching faces, and also a small annular pocket inside of the large annular pocket. Means are provided such as a circular coaxial groove or slot, cut at an intermediate radius from the back of the stator through the large pocket and to the back of the small pocket, with a corresponding cylindrical baffle inserted into that slot or groove so that by its axial position it may control the passage of fluid radially within the large pocket of the stator.

It is part of this invention in another embodiment to continue the cylindrical slot, not only through the space of the large pocket, but also through the wall of the small pocket, down to the face of the small and large pockets, so that the entire flow of liquid within both the large and small pockets can be closed or opened as desired by adjusting the axial position of the cylindrical tube baffle positioned in that slot. Mechanical, pneumatic or hydraulic means, in combination with spring means may be used to control the axial position of the cylindrical baffle.

A yet further important aspect of this invention is provision of a hydrokinetic brake in which the control of the brake is achieved by controlling the flow of the fluid within the stator pocket or pockets while yet supplying a substantially constant amount of fluid to the brake.

In addition, this invention permits ready control of the brake requirements no matter the location on the drilling rig of the operator and/or the draw-works.

BRIEF DESCRIPTION OF THE DRAWINGS

These and other objects and advantages of this invention and a better understanding of the principles and details of the invention will be evident from the following description, taken in conjunction with the appended drawings, in which.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in the various ways. Also, it is to be understood that the phraseology or terminology employed herein is for the purpose of description and not of limitation.

Figure 1:
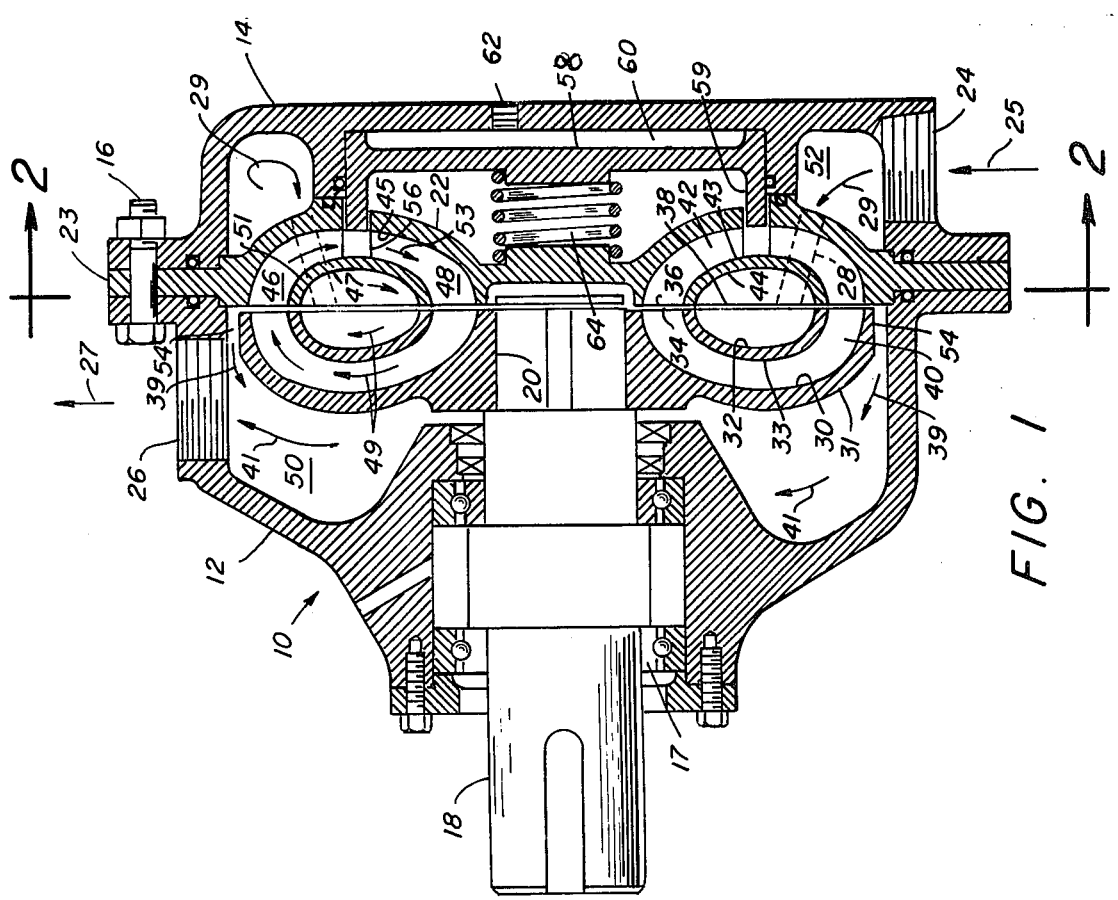
FIG. 1 represents a vertical sectional view of one embodiment of the apparatus.
Figure 2:
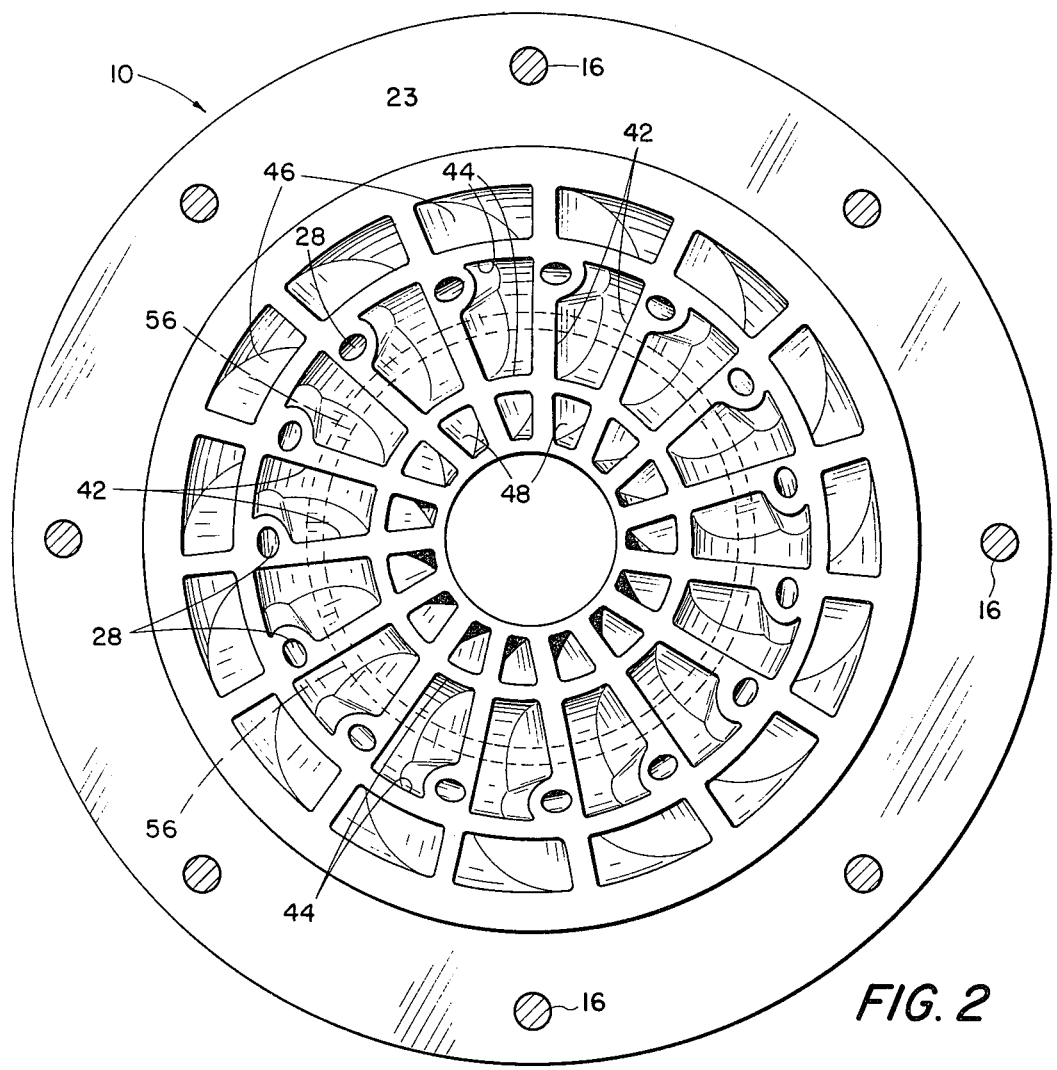
FIG. 2 is a vertical sectional view transverse to the axis along the line 2—2 of FIG. 1.

Referring now to the drawings and in particular to FIGS. 1 and 2, there is shown a brake indicated generally by the numeral 10. It comprises a housing 12 and 14. There is a shaft 18 journalled in bearings 17 in the portion of the housing 12 as is described in the copending applications Ser. No. 277,669, filed Aug. 3, 1972, now U.S. Pat. No. 3,860,097, and Ser. No. 474,045, filed May 28, 1974, now U.S. Pat. No. 3,945,473. A rotor 20 is supported and locked to the shaft 18. It comprises a circular assembly having a large annular pocket 30 with a back wall 31 and a front face 34. There is a small annular pocker 32 with a back wall 33 having a front face in the plane 34. Pocket 30 is identical in geometrical shape to pocket 32 except the latter is smaller. Preferably pockets 30 and 32 are spaced from each other a substantially constant amount. This is for the reason to establish substantially constant flow in the large pocket, i.e. between inside wall 30 and the backside of the small pocket 33. There is a coaxial stator 22 having a large annular pocket 45. The stator also has a small annular pocket 47 with a back surface 51. The large and small pockets in the rotor and stator are substantially mirror images of each other, in section, as shown in FIG. 1.

There are a plurality of vanes 40 in the rotor 42 in the stator. The vanes in the rotor are set at an acute angle to the face 34 leading into the direction of rotation of the rotor. The vanes 42 in the stator are equally spaced the same as those in the rotor but are turned at an angle opposite to those in the rotor. In other words, liquid thrown out of the pockets by the rotor is directed into the pockets of the stator.

FIG. 2 is a cross section along the plane 2—2 of FIG. 1, which shows the face of the stator. The vanes are indicated by the numeral 42 and the outer and inner limits of the small pocket are indicated by the bars 44 across the face of the stator.

Each vane in the stator has a conduit cored or bored through the vane identified by numeral 28, which leads from the back surface 22 of the stator into the face 36 of the stator. Liquid for the hydrokinetic brake enters through the opening 24 in accordance with the arrow 25, and flows in accordance with arrows 29 from a plenum 52 through the conduits or openings 28 to the face 36 of the stator. This is important from the standpoint that the brake will thus be continuously supplied with liquid no matter the location of the cylindrical flow control member 59. It flows through the gap 38 between the two faces 34 and 36 of the rotor and stator, so that it fills all the spaces within the large and small pockets. The flow of liquid in the rotor and stator pockets is in a radially outward direction as shown by the arrows 49 and back in accordance with arrows 53 in the stator. The excess liquid to compensate for that which enters through opening 24 flows outward through the gap 38 between the rotor and stator faces, and axially through the annular gap 54 between the outer circumferential face of the rotor and the inner face of the housing 12 in accordance with arrow 39. It then flows into the plenum 50 and out through the opening 26 in accordance with arrow 27.

As pointed out in the copending applications, the radial dimension of the gap 54 is important in controlling the flow of liquid through the brake. By making the control at the outlet of the brake, it insures that the pockets will all be filled with liquid at all times, which provides for a stable load-speed situation.

The stator 22 is supported by a planar flange 23 which is clamped by means of bolts 16 between the parts 12 and 14 of the housing. Suitable seals are provided between the stator and the housing, so that the liquid will flow from the inlet openings 24 through the conduit 28 into the gap 38 between the two sets of pockets, and out through the annular opening 54 and through the outlet 26.

There is a coaxial circular groove or slot 56 cut at a radius corresponding to the maximum axial dimension of the small pocket. This is cut from the back surface 22 of the stator to the back surface 43 of the small pocket 47. Preferably slot 56 is located at a point within the flow contour characteristics so as to be perpendicular with the flow of fluid in the outer pocket that is, the inner and outer pockets, the groove, and the cylindrical control member are located relative to each other such that a tangent to the curvature of the walled outer surface of the inner pocket and a tangent to the curvature of the walled inner surface of the outer pocket at their point of intersection with the outer surface of the cylindrical control member will be perpendicular to the cylindrical control member's outer surface. In addition, the slot or groove 56 is located such that the outer perimeter of the groove is within the radial location of the conduits 28. The importance of the location of the cylindrical groove and the cylindrical means therein so that the impinging fluid flow strikes the cylinder at a right angle. Otherwise, the force of the impinging fluid would tend to cause the cylindrical member 59 to move axially into or out of the slot. There is a cylindrical pipe or tube 59 adapted to slide in the groove 56. This has a transverse wall or plate 58. Spring means 64 may be provided in the space between the stator and the wall 58 to urge the wall outwardly, so as to provide a clear passage within the large pocket of the stator. In the space between the plate 58 and the outer wall 14 of the housing, means are provided opening 62 for provision of pneumatic or hydraulic fluid into the space 60, to urge the piston axially to the left so that the pipe 59 slides in the groove 56 and can block all or part of the cross section of the large pocket, so that fluid flow in accordance with arrow 53 will not be possible. Upon release of pneumatic or hydraulic pressure on the plate 58, the spring forces the plate 58 to the right, opening up the passage so that fluid flow 53 can resume. When there is no flow through the stator pockets the braking effect of the large stator pocket is eliminated. When the pipe 59 is retracted so that liquid flow 53 can resume, then the maximum braking provided by the large pocket is available.

Figure 3:
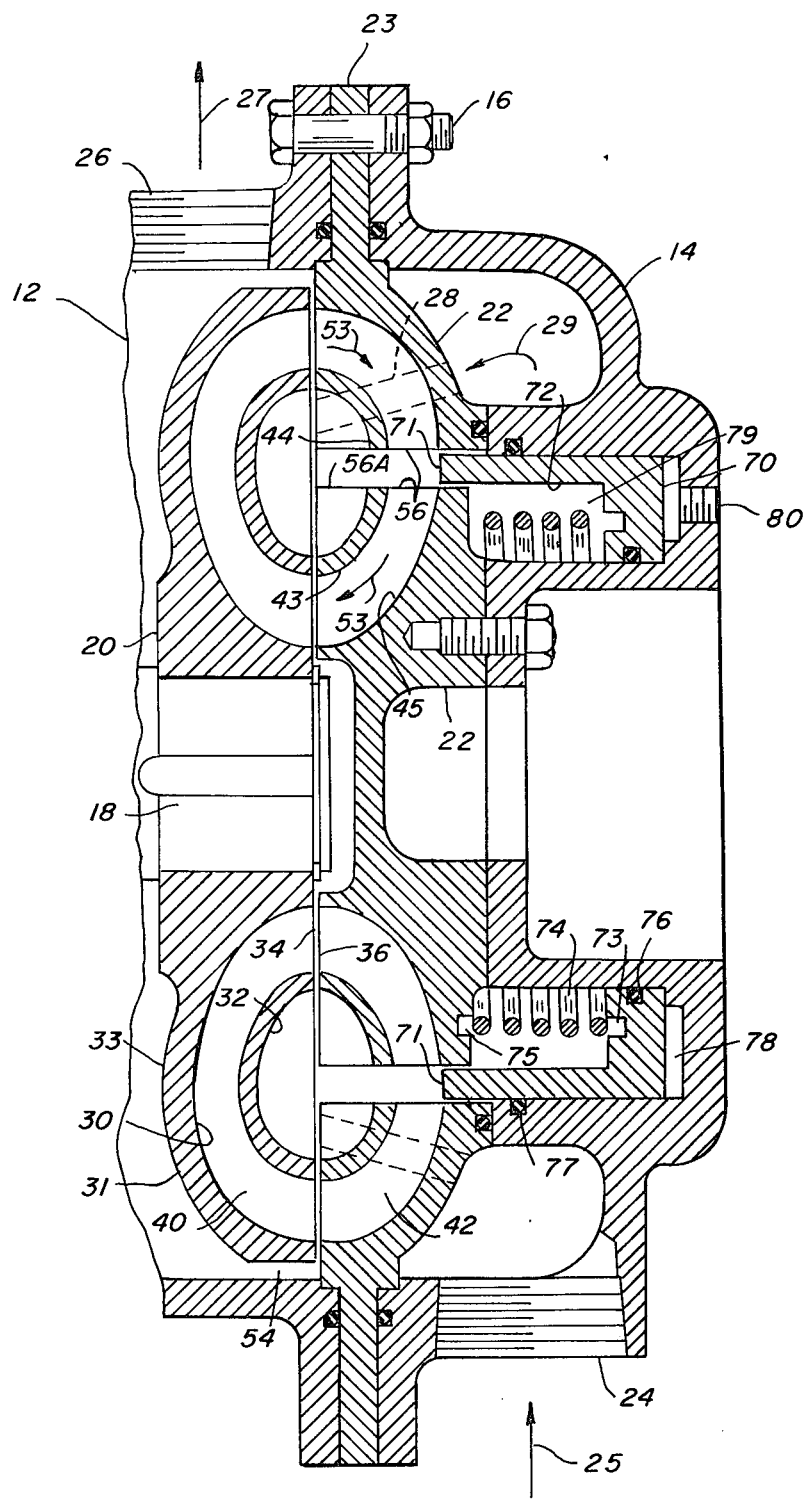
FIG. 3 represents a partial vertical section passing through the axis showing a second type of hydrokinetic brake control apparatus.

Reference is now made to FIG. 3 which shows a modification of the assembly of FIG. 1, in which the groove 56 is cut not only through the space in the large pocket, but through the back wall 43 of the small pocket, as an extension 56A, down to the face 36 of the stator. Thus, in FIG. 3 is shown the cylinder 72 which is now of greater length, compared to that of FIG. 1, so that the cylinder can travel until the end 71 is flush with the face 36 of the stator. In that position it can close off fluid flow in the stator through both the large and the small pockets, and minimize the braking effort of the hydrokinetic brake.

The cylinder 72 of FIG. 3 is modified from that shown in FIG. 1 in that the circular plate 58 now becomes an annular plate 70, attached to the pipe 72. This annular plate 70 acts as a piston in an annular space 79. There is a fluid space 78 behind the piston 70 into which pressure fluid can be supplied through opening 80 to urge the piston 70 and the attached pipe 72 to the left in opposition to the spring 74. In so doing, the pipe 72 can close off part or all of the two spaces within the large and small pockets. Various seals, such as "O" rings, are utilized as necessary to seal the stator into the housing and also to seal the pistons 58 and 70 into their appropriate cylindrical operating space. All this is well known in the art. While the operation of the piston 70 and cylinder 72 in the slot 56 is shown as pneumatic or hydraulic in combination with a spring return, the operation can be entirely mechanical by means of levers operating the pipe 72 and 59, as would be knowledgeable to the man skilled in the art.

Comparison of FIGS. 1 and 3 illustrates that in a single rotor and stator system, a single cylinder and pipe can be used to control the flow either in the large pocket alone or in both the large pocket and the small pocket of the stator.

Figure 4:
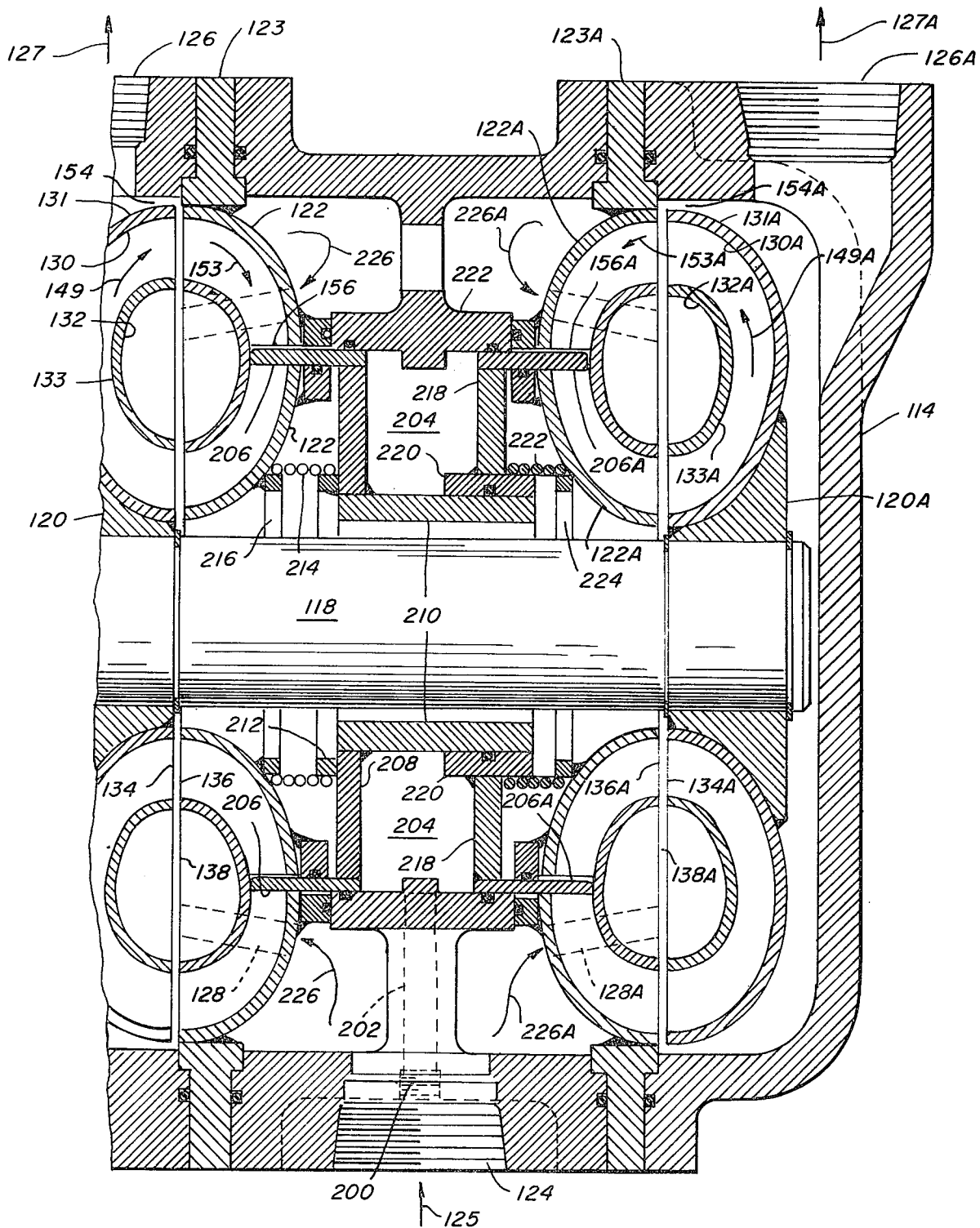
FIG. 4 is a third embodiment of the invention in a brake having two rotors and stators with fluid control of both stator pockets.

Referring now to FIG. 4 there is shown an embodiment similar to that of FIG. 1 except that there are two rotors 120, 120A spaced apart, facing each other, and two stators 122, 122A supported in the space between the two rotors, with the faces of the stators 136 and 136A at the desired gaps 138, 138A, from the two rotor faces. The stators are spaced apart back to back and in the space between them there is cut two axial circular grooves 156 and 156A between the back surfaces of the large pockets of the stators and the back surfaces of the small pockets. There are two pipes 206 and 206A mounted on pistons 208 and 218. Both pistons are in a single cylinder, face to face, so that pressure fluid applied through an opening 200, 202 to the cylindrical space 204, which is in the form of an annular cylinder, can move the two pistons and their cylindrical pipes 206 and 206A, simultaneously outwardly, against the restraint of helical springs 214 and 222, respectively, to control the flow of liquid in the stator pockets. Of course the grooves 156, 156A can be cut through the large pocket space only, or through both the large and small pocket spaces.

One pipe 206 is attached, as by welding, to an annular plate 208, which forms a piston. The piston carries also a smaller tubular member 210. The tubular member 210 and the fixed cylindrical portion 222 provide an annular cylinder for the piston 218 carrying the pipe 206A in the second stator. The helical springs 214 and 222, which are guided by the rings 216 and 224, provide the restraint, and the force to retract the pistons when the pressure fluid is removed from the space 204.

In the operation of a hydrokinetic brake the stability of operation is improved if the pockets, both the large and small, are filled with liquid at all times and the outlet control of flow accomplished by means of the annular gaps 154 and 154A. As the rotor rotates, the liquid in the rotor pockets is thrown radially outwardly in accordance with arrows 149 and 149A, as in a centrifugal pump. If the flow channel within the stator large pockets and small pockets are open, the flow from the rotor goes into the pockets of the stator and flows radially inwardly in accordance with arrows 153, 153A. It is the impact of the liquid from the stator into the rotor pockets, with the consequent generation of turbulence and heat, that represents lost energy, and restraint to the movement of the rotor, that is, the braking effect. However, if there is no flow through the stator pockets, this heat generation is reduced to a minimum, and simply involves the friction involved in the flow of liquid into the rotor and out through the control gaps 154, 154A. Therefore, by controlling the rate of flow of liquid in the stator pockets, the amount of braking effort can be varied with the entire brake in a stable operation.

As shown in FIG. 1 it is possible to make the control element, that is the coaxial pipe and groove, operate only through the space within the large pocket, or as in FIG. 3 the operation of the flow control element can be activated through the large pocket and also the small pocket, giving a maximum control of braking effort.

Figure 5:
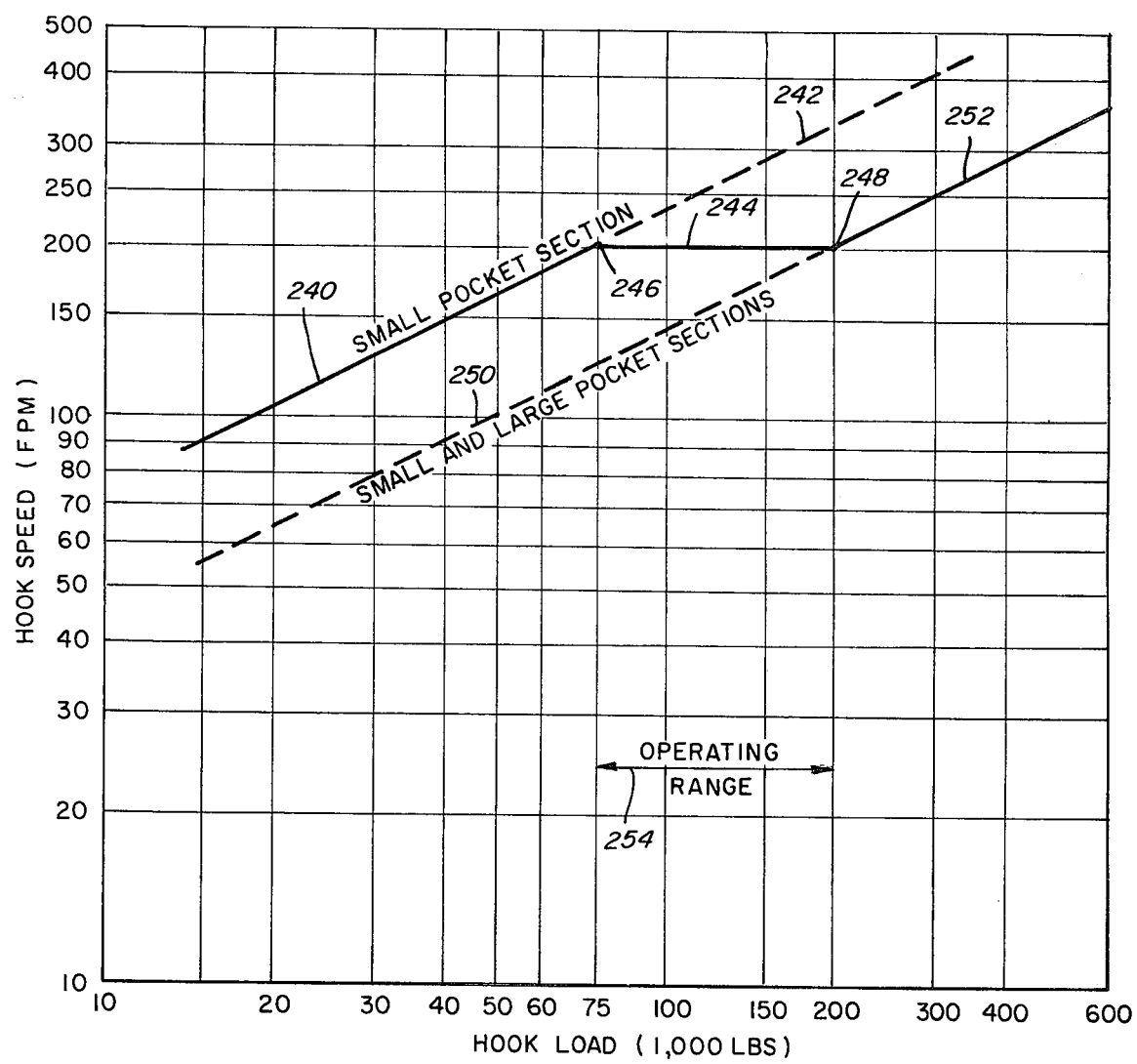
FIG. 5 illustrates a diagram showing the load speed versus load with the use of a dual pocket brake having control means for controlling the rate of flow of liquid in the large pockets.
Figure 6:
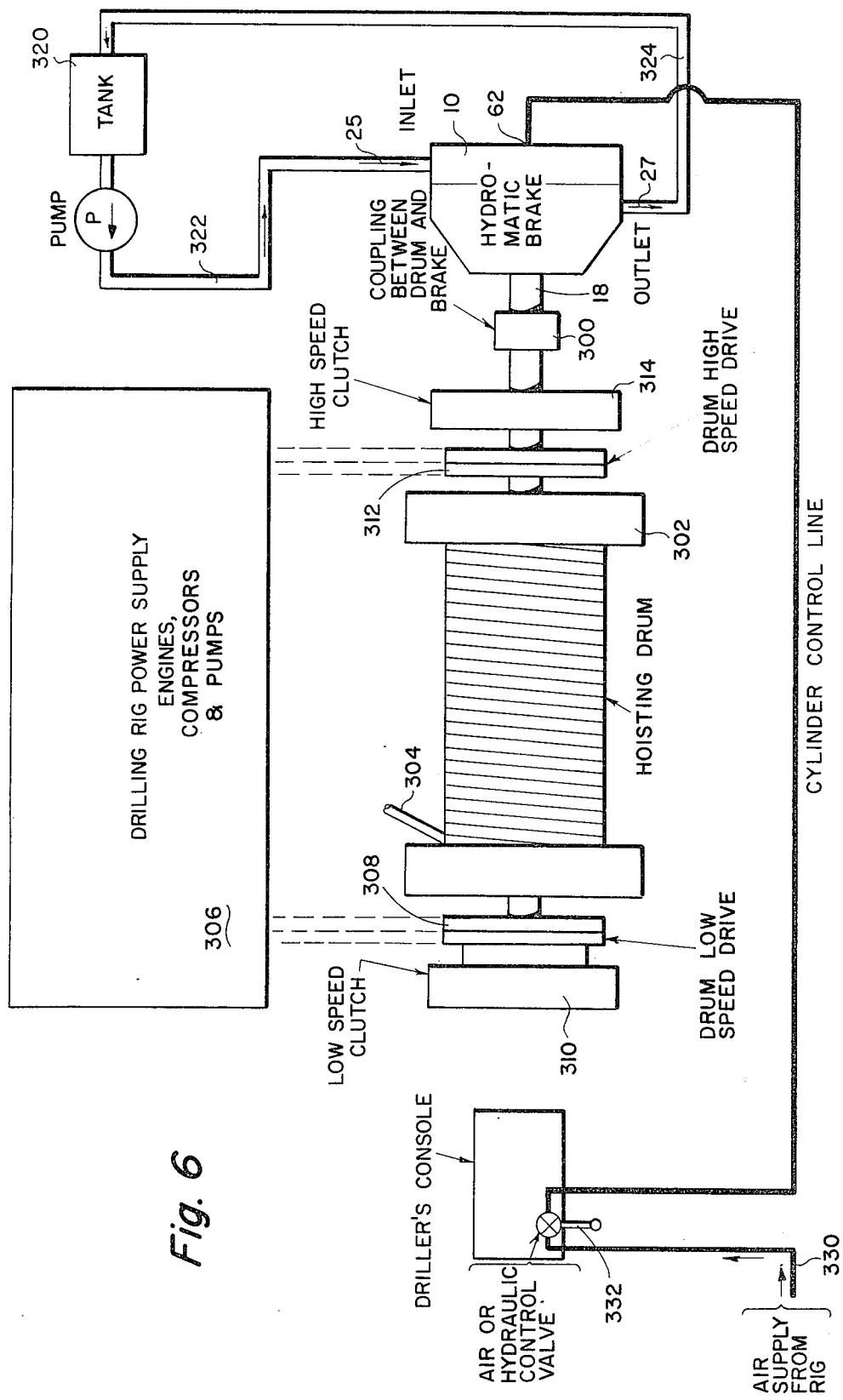
FIG. 6 is a schematic view of the apparatus of this invention as used in conjunction with a drilling rig drawworks system.

Referring now to FIG. 5 there is shown a diagram in which the ordinate represents load speed, that is the speed of the lifting hook in a rotary drilling apparatus for example, while the abscissa represents the hook load, that is the load supported by the drilling cables. FIG. 6 is a schematic showing the brake 10 attached via shaft 18, coupling 300 to drum 302. The drum contains spiral wrapped wire line 304 which is directed by way of a sheave atop a drilling derrick down to a hoisting hook and/or elevator for raising and lowering the drill pipe, not shown, but well known in the art. The hoist drum is driven by a power plant 306 by either a low speed drive 308 and clutch 310 or high speed drive 312 and clutch 314. Water from a supply tank 320 is pumped via conduit 322 to the inlet of the brake 10 with the outlet conduit 324 returned to tank 320. Most rigs include a fluid pressure supply (air in this instance) 330 which is controlled by the driller by valve 332 to connection, e.g. 62 of FIG. 1 for operating the movable plate 58 into the stator pockets. The purpose of the hydrokinetic brake in that application is to provide a restraint on the rotation of the cable drum, so that the load supported by the hook or elevator will move no faster than a selected speed of say 200 feet per minute, over a selected range of load, that is, from 75,000 to 200,000 pounds.

The small pocket alone is adequate for braking the hook when the loads are less than 75,000 pounds. The portion of the characteristic labelled 240 (solid line) represents the speed of the hook as the load increases from 15,000 up to 75,000 pounds, while the speed varies from 90 feet per minute to 200 feet per minute. It has been decided that the speed of 200 feet per minute is the selected operating speed. It is clear that if the small pocket is used alone, that, as the load increases above 75,000 pounds, the hook speed will increase in accordance with the dashed extension 242 of the characteristic of the small pocket section. This is undesired. The large pocket has been closed off by the control means 332 during the time that hook loads are less than 75,000 pounds, that is, for the conditions of characteristic 240 up to the point 246. As the load increases beyond 75,000 pounds, the control means is retracted, permitting an increasing amount of liquid flow through the large pockets. This movement of the control is synchronized with the load so that the characteristic load speed remains at about 200 feet per minute, up to a point 248, corresponding to a load of 200,000 pounds. At this point the control means are completely withdrawn from the large pocket space, and no further control of liquid flow is possible. Consequently, as the load increases beyond 200,000 pounds the speed of the hook increases beyond 200 feet per minute in accordance with characteristic 252. The characteristics 250 and 252 represent the speed versus load characteristics with both small and large pocket sections operative.

It would be possible to extend the portion 244 to the left, and maintain a 200 feet per minute speed for lesser loads than 75,000 pounds, by the embodiment of FIG. 3, by closing off part of the flow in the small pocket.

Referring to FIG. 3 the end portion 71 of the pipe 72 can be square as shown, or it can be rounded into any selected shape, so as to minimize the turbulence due to the flow of liquid around the end of the pipe as it partially projects into the liquid flow in the large pocket.

Reference is made to copending application Ser. No. 277,669 and 474,045 for further details of the construction of the hydrokinetic brake. It will be clear that while this embodiment of the invention, namely, the axially moving coaxial pipe operating in slots through the space of the large pocket and the small pocket of the stator is shown applied to the type of brake disclosed in the referenced applications, this feature of control of flow by the use of annular small and large pockets and a control pipe can be applied to any other type of hydrokinetic brake.

Figure 7:
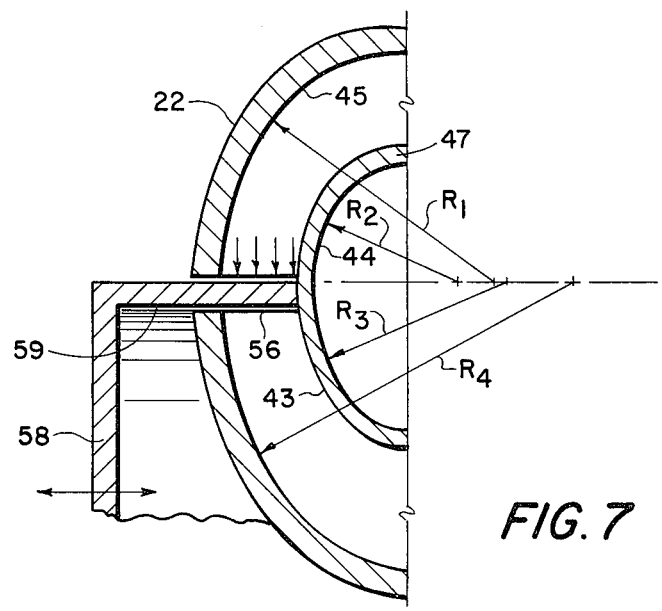
FIG. 7 is a partial section depicting the relationship of fluid flow to the pocket flow adjustment means.

An important aspect of the invention is the placement of the cylindrical pipe 59 relative to the flow of liquid. As shown in FIG. 7 the perimeter is to be located relative to the pocket so as to be perpendicular to the flow as shown by the arrows and thus balance the forces on the cylindrical pipe 59.

What is claimed:

1. In a hydro-kinetic brake means having at least a single rotor and a single stator each with an annular liquid pocket facing each other at the same circumferential distance from the axis of rotation and said rotor and stator spaced a selected distance apart, each pocket having a plurality of planar vanes extending radially across said pockets and tilted in said rotor in the direction of rotation of said rotor, and tilted in the opposite direction in the stator, the improvement comprising:

said annular pockets in said stator and said rotor each divided by walled surfaces into inner smaller and outer larger pockets the distance between the outer wall surface of said inner pocket and the inner wall surface of said outer pocket being constant, said inner and outer pockets having the same curved configuration, said vanes in said outer pockets continuing across said inner pockets;

conduit means in said vanes in said stator pockets, said conduit means having its liquid inlet at the back of said outer pockets in said stator and its liquid outlet radially located at the space between said rotor and stator within said inner pockets to provide initial continuous liquid flow into said inner pockets through the space between said stator and rotor, thence into each of said outer pockets during rotation of said rotor;

a cylindrical groove co-axial with the axis of rotation cut through the back of the stator and the vanes in the outer pocket, said groove being located such that the outer perimeter of said groove is within the radial location of said conduit outlets;

right circular cylindrical means, located within said groove, said cylindrical means being non-rotative and adapted to axially reciprocate in said groove;

said inner and outer pockets, said groove, and said cylindrical means located relative to each other such that a tangent to the curvature of the walled outer surface of said inner pocket and a tangent to the curvature of the walled inner surface of said outer pocket at their point of intersection with the outer surface of said cylindrical means will be perpendicular to said outer surface of said cylindrical means; and means to reciprocate said cylindrical means.

2. The hydro-kinetic brake means as in claim 1 in which said means to reciprocate said cylindrical means comprises:

fluid pressure actuated means.

3. The hydro-kinetic brake means as in claim 1 in which said means to reciprocate said cylindrical means includes spring means normally biased to maintain said cylindrical means out of said groove.

4. The hydro-kinetic brake means as in claim 1 including two stators and two rotors.

5. In an oil well drilling derrick having a power driven rotatable drum for reeling cable used in hoisting operations on said derrick and a hydrokinetic brake attached to the drum for retardation of rotation of said drum, said brake having at least a single rotor and a single stator each with an annular liquid pocket facing each other at the same circumferential distance from the axis of rotation and said rotor and stator spaced a selected distance apart, each pocket having a plurality of planar vanes extending radially across said pockets and tilted in said rotor in the direction of rotation of said rotor, and tilted in the opposite direction in the stator, the improvement in varying the absorption characteristics of said brake comprising:

said annular pockets in said stator and said rotor each divided by walled surfaces into inner smaller and outer larger pockets the distance between the outer wall surface of said inner pocket and the inner wall surface of said outer pocket being constant, said inner and outer pockets having the same configuration, said vanes in said outer pockets continuing across said inner pockets;

conduit means in said vanes in said stator pockets, said conduit means having its liquid inlet at the back of said outer pockets in said stator and its liquid outlet radially located at the space between said rotor and said stator within said inner pockets to provide initial continuous liquid flow into said inner pockets through the space between said stator and rotor, thence into each of said outer pockets during rotation of said rotor;

a cylindrical groove co-axial with the axis of rotation cut through the back of the stator and the vanes in the outer pocket, said groove being located such that the outer perimeter of said groove is within the radial location of said conduit outlets;

right circular cylindrical means located within said groove said cylindrical means being non-rotative and adapted to axially reciprocate in said groove;

said inner and outer pockets, said groove, and said cylindrical means located relative to each other such that a tangent to the curvature of the walled outer surface of said inner pocket and a tangent to the curvature of the walled inner surface of said outer pocket at their point of intersection with the outer surface of said cylindrical means will be perpendicular to said outer surface of said cylindrical means; and means to reciprocate said cylindrical means.

6. The improvement in hydro-kinetic brake means as in claim 5 in which said means to reciprocate said cylindrical means comprises:

fluid pressure actuated means.

7. The improvement in brake means in claim 6 including a control means for supplying said fluid pressure to said brake.

8. The improvement in claim 7 wherein said control means is located at a control panel adjacent said hoisting drum.

9. The hydro-kinetic brake means as in claim 6 in which said groove extends from the back of said stator to the front face of said inner pockets and wherein said fluid pressure actuated means controls said flow of liquid in both said outer and inner pockets.

10. The hydro-kinetic brake means as in claim 5 in which said means to reciprocate said cylindrical means includes spring means normally biased to maintain said cylindrical means out of said groove.

11. The hydro-kinetic brake means as in claim 5 including two stators and two rotors.

12. In a hydro-kinetic brake means having at least a single rotor and a single stator each with an annular liquid pocket facing each other at the same circumferential distance from the axis of rotation and said rotor and stator spaced a selected distance apart, each pocket having a plurality of planar vanes extending radially across said pockets and tilted in said rotor in the direction of rotation of said rotor, and tilted in the opposite direction in the stator, the improvement comprising:

said annular pockets in said stator and said rotor each divided by walled surfaces into inner smaller and outer larger pockets the distance between the outer wall surface of said inner pocket and the inner wall surfaces of said outer pocket being constant, said inner and outer pockets having the same curved configuration, said vanes in said outer pockets continuing across said inner pockets;

conduit means in said vanes in said stator pockets, said conduit means having its liquid inlet at the back of said outer pockets in said stator and its liquid outlet radially located at the space between said rotor and stator within said inner pockets to provide initial continuous liquid flow into said inner pockets through the space between said stator and rotor, thence into each of said outer pockets during rotation of said rotor;

a cylindrical groove co-axial with the axis of rotation cut through said walled surfaces of said stator and the vanes in the outer and inner pockets, said groove being located such that the outer perimeter of said groove is within the radial location of said conduit outlets;

right circular cylindrical means, located within said groove, said cylindrical means being non-rotative and adapted to axially reciprocate in said groove to control flow of liquid in said outer and inner pockets;

said inner and outer pockets, said groove, and said cylindrical means located relative to each other such that a tangent to the curvature of the walled outer surface of said inner pocket and a tangent to the curvature of the walled inner surface of said outer pocket at their point of intersection with the outer surface of said cylindrical means will be perpendicular to said outer surface of said cylindrical means;

spring means normally biased to maintain said cylindrical means out of said pockets; and fluid pressure actuated means to move said cylindrical means into said pockets.

* * * * *